United States Patent
Fedullo et al.

(10) Patent No.: US 10,821,957 B2
(45) Date of Patent: Nov. 3, 2020

(54) TRANSMISSION WITH SELECTABLE ONE-WAY CLUTCH

(71) Applicant: FORD GLOBAL TECHNOLOGIES, LLC, Dearborn, MI (US)

(72) Inventors: Timothy Fedullo, Northville, MI (US); Conor Edward Sullivan, Canton, MI (US); Stephen Michael Cicala, Dearborn Heights, MI (US); John Randall Armstead, Farmington Hills, MI (US); Bradley Dean Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/519,785

(22) Filed: Jul. 23, 2019

(65) Prior Publication Data

US 2020/0031331 A1 Jan. 30, 2020

Related U.S. Application Data

(60) Provisional application No. 62/711,686, filed on Jul. 30, 2018.

(51) Int. Cl.
| | |
|---|---|
| *F16D 48/06* | (2006.01) |
| *B60W 10/02* | (2006.01) |
| *B60K 23/02* | (2006.01) |
| *F16D 13/58* | (2006.01) |
| *F16D 48/02* | (2006.01) |

(52) U.S. Cl.
CPC ............. *B60W 10/02* (2013.01); *B60K 23/02* (2013.01); *F16D 13/58* (2013.01); *F16D 48/062* (2013.01); *B60W 2510/0208* (2013.01); *F16D 2048/0227* (2013.01)

(58) Field of Classification Search
CPC ...... F16D 48/06; F16D 48/062; F16D 48/064; F16D 2500/1045; F16D 2500/10493; F16D 2500/30406; F16H 61/04; F16H 2061/044
See application file for complete search history.

(56) References Cited

U.S. PATENT DOCUMENTS

| | | | |
|---|---|---|---|
| 6,290,044 B1 | 9/2001 | Burgman et al. | |
| 8,083,042 B2 | 12/2011 | Samie et al. | |
| 8,196,724 B2 | 6/2012 | Samie et al. | |
| 10,030,722 B2* | 7/2018 | Diaz | F16D 41/125 |
| 2008/0076632 A1* | 3/2008 | Watanabe | F16H 59/72 |
| | | | 477/98 |
| 2013/0153353 A1* | 6/2013 | Teslak | F16H 61/04 |
| | | | 192/3.54 |
| 2014/0121914 A1* | 5/2014 | Neelakantan | F16H 61/0437 |
| | | | 701/53 |

* cited by examiner

*Primary Examiner* — Edwin A Young
(74) *Attorney, Agent, or Firm* — Vincent Mastrogiacomo; Brooks Kushman P.C.

(57) ABSTRACT

A transmission includes a selectable one-way clutch with active and passive states. Successful transition from the active state to the passive state is only possible when there is no torque tending to cause overrunning. After commanding a transition from the active state to the passive state, a controller partially engages a first friction clutch to induce a torque tending away from overrunning until a lash crossing is detected. Then, the controller releases the first clutch and partially applies a second clutch to induce a torque toward overrunning. When slip is detected, indicating successful achievement of the passive state, the second clutch is released.

20 Claims, 2 Drawing Sheets

TRANSMISSION WITH SELECTABLE ONE-WAY CLUTCH

CROSS-REFERENCE TO RELATED APPLICATIONS

This application claims the benefit of U.S. provisional application Ser. No. 62/711,686 filed Jul. 30, 2018, the disclosure of which is hereby incorporated in its entirety by reference herein.

TECHNICAL FIELD

This disclosure relates to the field of transmissions for motor vehicles. More particularly, the disclosure pertains to a transmission having a selectable one-way clutch and a method of operating the transmission to facilitate dis-engagement of the selectable one-way clutch.

BACKGROUND

Many vehicles are used over a wide range of vehicle speeds, including both forward and reverse movement. Most types of internal combustion engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Many transmissions utilize friction clutches and brakes which are engaged in different combinations to establish different power flow paths having different speed ratios. One type of commonly used friction clutch is a wet multi-plate clutch. A clutch pack includes a set of friction plates splined to one component and interleaved with a set of separator plates splined to a different component. To engage the clutch, pressurized fluid is supplied to an apply chamber forcing a piston to squeeze the friction plates between the separator plates. Friction between the friction plates and separator plates prevents relative rotation, thereby coupling the two components to each other. When the fluid pressure is reduced, a return spring forces the piston away from the clutch pack removing the normal force such that relative rotation is possible with minimal drag.

Transmissions may also use one-way clutches that passively prevent relative rotation between two components in one direction while permitting relative rotation in the opposite direction. An actively controlled one-way clutch includes selectable states such as permitting relative rotation in both directions or preventing relative rotation in both directions.

SUMMARY

A transmission includes a selectable one-way clutch, a first friction clutch, a second friction clutch, and a controller. The controller is programmed to, command the selectable one-way clutch to transition from an active state to a passive state, partially engage the first friction clutch in response to the command to transition the selectable one-way clutch from the active state to the passive state, release the first friction clutch in response to detecting a lash crossing while the first friction clutch is partially engaged, partially engage the second friction clutch after releasing the first friction clutch, and confirm that the selectable one-way clutch has transitioned to the passive state upon detecting slip across the selectable one-way clutch while the second clutch is partially engaged.

A transmission includes a selectable one-way clutch, a first friction clutch, and a controller. The controller is programmed to switch the selectable one-way clutch from an active state to a passive state by commanding the selectable one-way clutch to the passive state, then partially engaging the first friction clutch, and then releasing the first friction clutch in response to a lash crossing.

A method of verifying a transition of a selectable one-way clutch from an active state to a passive state in a vehicle transmission includes commanding the selectable one-way clutch to transition from the active state to the passive state, partially engaging a first friction clutch within the transmission in response to the command to transition the selectable one-way clutch from the active state to the passive state, releasing the first friction clutch in response to detecting a lash crossing while the first friction clutch is partially engaged, partially engaging a second friction clutch within the transmission after releasing the first friction clutch, and verifying that the selectable one-way clutch has transitioned to the passive state upon detecting slip across the selectable one-way clutch while the second clutch is partially engaged.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
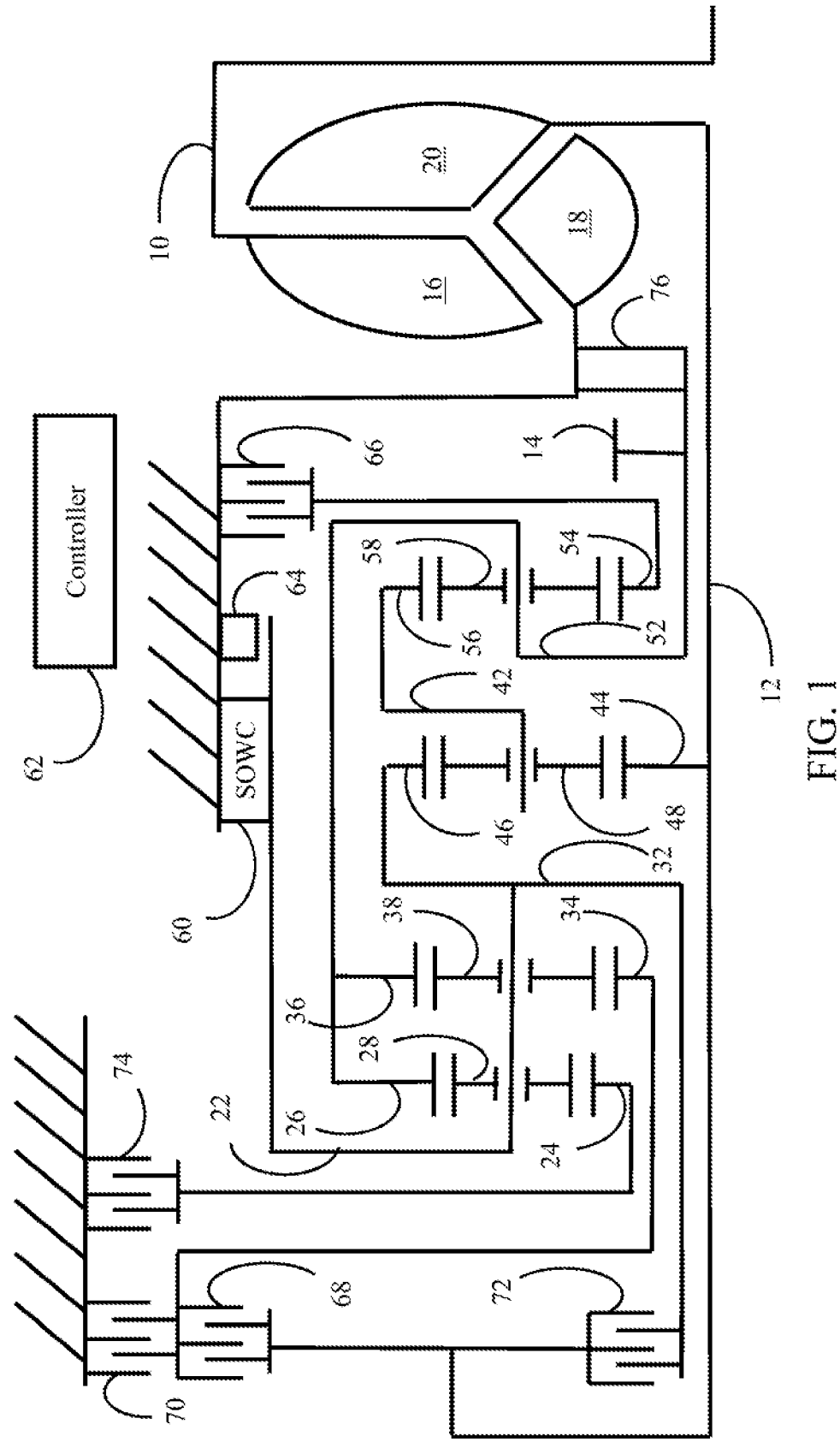
FIG. 1 is a schematic diagram of an automotive transmission.

FIG. 1 is a schematic diagram of a transmission gearbox and torque converter. Only the top half of the gearbox and torque converter are shown because most of the components are axisymmetric. A transmission input shaft 10 is driveably connected to a power source such as an internal combustion engine. Power is transferred from transmission input shaft 10 to turbine shaft 12 by the torque converter. Power is then transferred from the turbine shaft 12 to an output element 14 by the gearbox. Power is transferred from output element 14 to vehicle driving wheels via a final drive mechanism, differential, and axle (not shown). Although power flows primarily from the engine to the driving wheels, there are some operating conditions, such as coasting on downhill grades in which power flows in the opposite direction.

The transmission gearbox in FIG. 1 is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. The transmission gearbox is a discrete ratio transmission having a shiftable gearing arrangement that selectively imposes a variety of speed ratios between an input to the transmission gearbox (i.e., input shaft 10) and an output of the transmission gearbox (i.e., turbine shaft 12).

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one-way clutches. A clutch that holds an element against rotation by selectively connecting the element to a fixed component, such as a transmission housing, may be called a brake.

The torque converter includes an impeller 16, a stator 18, and a turbine 20. The impeller is fixed to input shaft 10. The stator 18 is attached to the transmission case via a one-way clutch. The turbine 20 is fixed to turbine shaft 12. Impeller 16 acts as a centrifugal pump propelling fluid in a toroidal pattern. When the impeller speed exceeds the turbine speed, the flowing fluid encounters blades of the turbine imparting a torque on the turbine. The stator 18 redirects the flow exiting the turbine and directs it back into the impeller. When the impeller spins substantially faster than the turbine, the torque exerted on the turbine is a multiple of the torque exerted by the impeller. The torque converter allows the engine to rotate and exert torque on the turbine shaft even when the turbine shaft is stationary or moving backwards. This characteristic is very useful for initiating vehicle movement from a standstill.

The gearbox includes four simple planetary gearsets, each having carriers 22, 32, 42, and 52; sun gears 24, 34, 44, and 54; ring gears 26, 36, 46, and 56; and planet gears 28, 38, 48, and 58. The sun gears, ring gears, and carriers are all supported for rotation about a central axis. Each planet gear is supported for rotation with respect to the respective carrier and meshes with the respective sun gear and ring gear. Turbine shaft 12 is fixed to sun gear 44. Output element 14 is fixed to carrier 54, ring gear 26, and ring gear 36. Carrier 22, carrier 32, and ring gear 46 are mutually fixed. Carrier 42 is fixed to ring gear 56.

The gearbox also includes five friction clutches and one selectable one-way clutch. Each clutch selectively couples two elements. In this document, the term clutch includes devices that selectively couple a rotatable element to the transmission case, sometimes called brakes. When a clutch is in an engaged state, torque may be transmitted from one of the two elements to the other selectively coupled element. When a clutch is in a fully engaged state, the rotational speeds of the two elements are constrained to be equal. A friction clutch may be in partially engaged state in which the speeds are not equal but torque is transferred between the elements. When a clutch is in a disengaged state, the element speeds may differ and very little torque is transferred (only parasitic drag).

Selectable one-way clutch (SOWC) 60 selectively couples carriers 22 and 32 and ring gear 46 to the transmission case. The SOWC 60 has a passive state and an active state. In the passive state, relative rotation is prevented in one direction but allowed in the opposite direction. The disengaged state of the SOWC 60 may be referred to as an overrunning state. In the active state, the SOWC 60 prevents relative rotation in both directions. In other words, in the active state, it is always fully engaged. Unlike a friction clutch, the SOWC 60 is not designed to operate in a partially engaged state. When the SOWC 60 transitions from the passive state to the active state, any relative rotation is suddenly eliminated, which can create uncomfortable sensations for vehicle occupants and may cause component failures. Therefore, the transmission controller 62 is programmed not to command such a transition unless the slip across the SOWC 60 is very low (less than 20 rpm). The slip may be measured by a speed sensor 64. The speed sensor 64 may then communicate the slip to the controller 62. Alternatively, the slip may be calculated based on other speed sensors. The SOWC 60 may not respond to a command to switch from the active state to the passive state while it is transmitting torque against the direction in which rotation would be allowed in the passive state. Therefore, the controller 62 needs to relieve such torque before commanding such a transition.

While illustrated as one controller, the transmission controller 62 may be part of a larger control system and may be controlled by various other controllers throughout the vehicle, such as a vehicle system controller (VSC). It should therefore be understood that the transmission controller 62 and one or more other controllers can collectively be referred to as a "controller" that controls various actuators in response to signals from various sensors to control functions the vehicle or vehicle subsystems (e.g., the vehicle transmission). The transmission controller 62 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the transmission controller 62 in controlling the vehicle or vehicle subsystems (e.g., the vehicle transmission).

Control logic or functions performed by the transmission controller 62 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as transmission controller 62. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Friction clutch 66 selectively couples sun gear 54 to the transmission case. Friction clutch 68 selectively couples turbine shaft 12 to sun gear 34. Friction clutch 70 selectively couples sun gear 34 to the transmission case. Friction clutch 72 selectively couples turbine shaft 12 to carrier 22, carrier 32, and ring gear 46. Friction clutch 74 selectively couples sun gear 24 to the transmission case. Various speed ratios between turbine shaft 12 and output element 14 are established by fully engaging the clutches in combinations of two as shown in TABLE 1.

TABLE 1

|  | 66 | 68 | 70 | 60 | 72 | 74 | Speed Ratio |
|---|---|---|---|---|---|---|---|
| $1^{st}$ | X |  |  | Passive |  |  | 4.484 |
| 1M | X |  |  | Active |  |  | 4.484 |
| $2^{nd}$ | X |  |  |  |  | X | 3.146 |
| $3^{rd}$ | X |  | X |  |  |  | 2.872 |
| $4^{th}$ | X | X |  |  |  |  | 1.842 |
| $5^{th}$ | X |  |  |  | X |  | 1.414 |
| $6^{th}$ |  | X |  |  | X |  | 1.000 |
| $7^{th}$ |  |  | X |  | X |  | 0.742 |
| $8^{th}$ |  |  |  |  | X | X | 0.616 |
| Reverse |  |  | X | Active |  |  | −2.882 |

The speed ratio is the same in $1^{st}$ gear and in 1M. However, in $1^{st}$ gear, the transmission only transmits torque from the engine to the vehicle wheels. If the driver releases the accelerator pedal while coasting forward, SOWC 60 will overrun and the engine speed will fall to idle. In the 1M gear state, on the other hand, SOWC 60 is in the ACTIVE state, so torque can be transmitted from the vehicle wheels to the engine resulting in engine braking. In Reverse, SOWC 60 must be in the active state in order to transmit power from the engine to the vehicle wheels.

In Park, a parking pawl 76 is engaged to hold the vehicle stationary. Unlike friction clutches 66-74, the parking pawl 76 is designed to remain engaged indefinitely with power consumption. In some vehicles, the parking pawl 76 may be mechanically linked to the shift selector. In other vehicles, it may be under the control of controller 62. In either case, there may be sensors which indicate the current status of parking pawl 76 to controller 62.

When the transmission is shifted from reverse, SOWC 60 is commanded from the active state to the passive state. Robust control software seeks to verify that a commanded change has, in fact, occurred. If SOWC 60 were to fail to switch from the active state to the passive state, then the transmission would not upshift correctly from first gear when it is in Drive. With most types of clutches, successful disengagement can be verified by immediate changes in speeds of transmission elements as indicated by various speed sensors such as sensor 64. The characteristics of a SOWC, however, prevent immediate feedback from a speed sensor. If the SOWC is carrying torque toward the overrunning condition at the time the state change from active to passive is commanded, then the SOWC will not change state until the torque is reversed. If, on the other hand, the SOWC is carrying torque away from the overrunning condition, then the passive behavior prevents any speed change until the torque is reversed.

Figure 2:
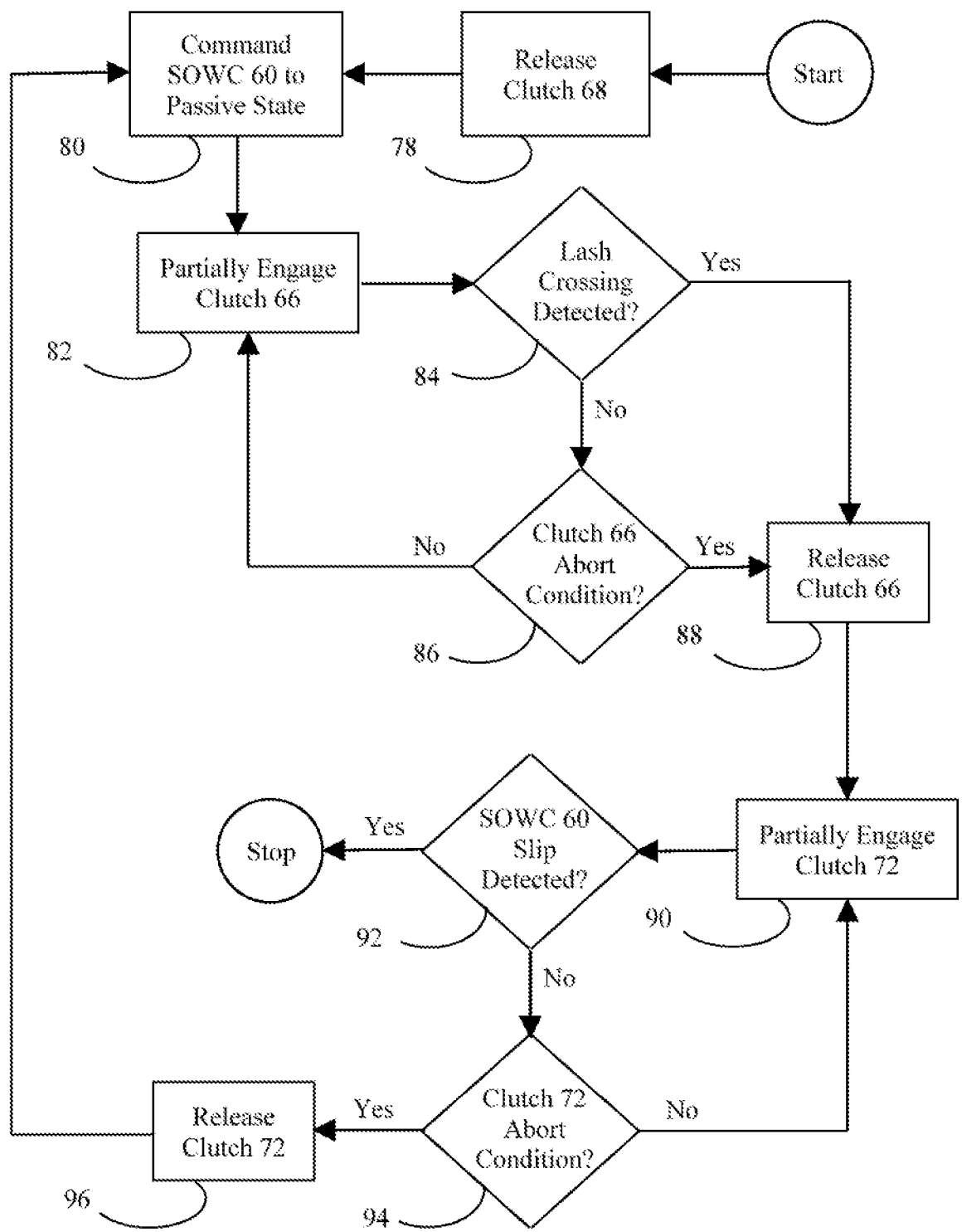
FIG. 2 is a flowchart illustrating a process for disengaging a reverse gear state in the automotive transmission of FIG. 1.

FIG. 2 illustrates a process for verifying that the commanded state change is successful when disengaging reverse. A very similar process is applicable when disengaging the 1M state or other states in which SOWC 60 is in the active state. When this process is initiated, the transmission is in reverse, the vehicle is stationary or at a very low speed, and the engine is running. Because reverse is engaged, the speed of turbine shaft 12 is proportional to the speed of output element 14. Since the vehicle is near stationary, that implies that the turbine shaft is either stationary or moving very slowly. With the engine running, the torque converter is applying positive torque to turbine shaft 12. The reaction torque is supplied by the SOWC 60, which is carrying torque toward the overrunning condition. In other words, SOWC is preventing carrier 22/32 from rotating in the direction that it would be permitted to rotate when in the passive state.

At 78, friction clutch 68 is released to place the transmission into a neutral state. The turbine shaft speeds up to near the speed of the engine crankshaft. Ideally, none of the gearbox components would transmit any torque in this state. However, in practice, various components have parasitic drag torque such that some torque is transferred. The direction of torque on SOWC 60 in this condition cannot be reliably predicted. At 80, SOWC is commanded to change state from active to passive.

If the torque on SOWC 60 at the time of the command is toward the overrunning condition, then it will not change state until the torque direction is changed. The next phase of the process is designed to ensure that torque away from the overrunning condition is produced. At 82, clutch 66 is partially engaged in a controlled manner. After stroking the clutch piston, the pressure to clutch 66 is gradually increased. As the commanded pressure to clutch 66 is increasing, the controller looks for an indication of a lash crossing within the transmission at 84. A lash crossing is a change in the direction of torque. One indicia of such a lash crossing is a decrease in the speed of turbine shaft 12 as indicated by a turbine speed sensor (not shown). Alternatively, a lash crossing could be indicated by a torque reversal as sensed by a torque sensor or by a high resolution position or speed sensor, for example. If no lash crossing is detected at 84, the controller checks whether an abort condition is present at 86. Example abort conditions include:

A change, such as a driver command, such that the SOWC 60 is desired to stay in the active state;

Detecting slip across the SOWC 60 confirming successful change to active state;

Clutch 66 becoming fully applied or a time limit expiring, indicating possible clutch or sensor error.

When either a lash crossing is detected at 84 or an abort condition is encountered at 86, clutch 66 is released at 88. Upon release of clutch 66, the turbine speed should return to near the speed of the engine crankshaft.

The next phase of the process is designed to verify that the SOWC 60 did change to the passive state. At 90, clutch 72 is partially engaged in a controlled manner. Torque capacity on clutch 72 tends to accelerate carrier 22/32 resulting in slip across SOWC 60. If SOWC 60 is still in the active state, then this acceleration of carrier 22/32 is prevented and torque capacity on clutch 72 will instead reduce the speed of turbine shaft 12. After stroking the clutch piston, the pressure to clutch 72 is gradually increased. As the commanded pressure to clutch 70 is increasing, the controller looks for an indication of slip across SOWC 60. If slip is detected at 92, clutch 72 is released, the process exits, and the controller proceeds to establish the next desired state. If slip across SOWC 60 is not detected at 92, the controller checks whether an abort condition is present at 94. Example abort conditions include:

A change, such as a driver command, such that SOWC 60 is desired to stay in the active state;

A significant reduction of turbine speed indicating SOWC is still in active state;

Clutch 72 becomes fully applied or a time limit expires, indicating possible clutch or sensor error.

If an abort condition is encountered at 94, then clutch 72 is released at 96 and the process returns to 80 to make another attempt.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
a selectable one-way clutch;
a first friction clutch
a second friction clutch; and
a controller programmed to,
command the selectable one-way clutch to transition from an active state to a passive state,
partially engaging the first friction clutch in response to the command to transition the selectable one-way clutch from the active state to the passive state,
release the first friction clutch in response to detecting a lash crossing while the first friction clutch is partially engaged,
partially engaging the second friction clutch after releasing the first friction clutch and confirming that the selectable one-way clutch has transitioned to the passive state upon detecting slip across the selectable one-way clutch while the second clutch is partially engaged.

2. The transmission of claim 1, wherein the controller is further programmed, in response to an abort condition and an absence of slip across the selectable one-way clutch while partially engaging the second clutch, to release the second clutch, then partially engage the first clutch again, and then release the first clutch in response to a lash crossing.

3. The transmission of claim 2, wherein the abort condition comprises a command to transition to a state in which the selectable one-way clutch is in the active state.

4. The transmission of claim 2, wherein the abort condition comprises a reduction in a turbine speed.

5. The transmission of claim 2, wherein the abort condition comprises expiration of a time limit.

6. The transmission of claim 2, wherein the abort condition comprises full engagement of the second clutch.

7. The transmission of claim 1, wherein the controller is further programmed, in response to an abort condition and an absence of the lash crossing while partially engaging the first clutch, to release the first clutch, then partially engage the second clutch, and then release the second clutch in response to slip across the selectable one-way clutch.

8. The transmission of claim 7, wherein the abort condition comprises a command to transition to a state in which the selectable one-way clutch is in the active state, expiration of a time limit, or full engagement of the first clutch.

9. A transmission comprising:
a selectable one-way clutch;
a first friction clutch; and
a controller programmed to switch the selectable one-way clutch from an active state to a passive state by commanding the selectable one-way clutch to the passive state, then partially engaging the first friction clutch, and then releasing the first friction clutch in response to a lash crossing.

10. The transmission of claim 9 further comprising a second friction clutch, and wherein the controller is further programmed to confirm that the selectable one-way clutch has transitioned to the passive state by partially engaging the second clutch until slip across the selectable one-way clutch occurs.

11. The transmission of claim 10, wherein the controller is further programmed, in response to an abort condition and an absence of slip across the selectable one-way clutch while partially engaging the second clutch, to release the second clutch, then partially engage the first clutch again, and then release the first clutch in response to a lash crossing.

12. The transmission of claim 11, wherein the abort condition comprises a command to transition to a state in which the selectable one-way clutch is in the active state.

13. The transmission of claim 11, wherein the abort condition comprises a reduction in a turbine speed.

14. The transmission of claim 11, wherein the abort condition comprises expiration of a time limit.

15. The transmission of claim 11, wherein the abort condition comprises full engagement of the second clutch.

16. The transmission of claim 9 further comprising a second clutch and wherein the controller is further programmed, in response to an abort condition and an absence of the lash crossing while partially engaging the first clutch, to release the first clutch, then partially engage the second clutch, and then release the second clutch in response to slip across the selectable one-way clutch.

17. The transmission of claim 16, wherein the abort condition comprises a command to transition to a state in which the selectable one-way clutch is in the active state.

18. The transmission of claim 16, wherein the abort condition comprises expiration of a time limit.

19. The transmission of claim 16, wherein the abort condition comprises full engagement of the first clutch.

20. A method of verifying a transition of a selectable one-way clutch from an active state to a passive state in a vehicle transmission comprising:
    commanding the selectable one-way clutch to transition from the active state to the passive state;
    partially engaging a first friction clutch within the transmission in response to the command to transition the selectable one-way clutch from the active state to the passive state;
    releasing the first friction clutch in response to detecting a lash crossing while the first friction clutch is partially engaged;
    partially engaging a second friction clutch within the transmission after releasing the first friction clutch; and
    verifying that the selectable one-way clutch has transitioned to the passive state upon detecting slip across the selectable one-way clutch while the second clutch is partially engaged.

* * * * *